United States Patent [19]

Girard

[11] 4,189,096
[45] Feb. 19, 1980

[54] CENTRAL HEATING PLANT
[75] Inventor: Edmond Girard, Boulogne, France
[73] Assignee: Messier, Paris, France
[21] Appl. No.: 852,812
[22] Filed: Nov. 18, 1977
[30] Foreign Application Priority Data Dec. 6, 1976 [FR] France ............................. 76 36640

[51] Int. Cl.$^2$ ............................................. G05D 23/02
[52] U.S. Cl. ..................................................... 237/2 B
[58] Field of Search ................. 237/1 A, 2 B, 8 R, 63
[56] References Cited
U.S. PATENT DOCUMENTS

| | | | |
|---|---|---|---|
| 3,989,183 | 11/1976 | Gustafsson | 237/2 B |
| 4,044,949 | 8/1977 | Morawetz | 237/1 A |
| 4,046,320 | 9/1977 | Johnson | 237/63 X |
| 4,052,001 | 10/1977 | Vogt | 237/2 B X |

Primary Examiner—William H. Schultz
Attorney, Agent, or Firm—J. Harold Nissen

[57] ABSTRACT

A central heating plant having a principal heat source and a make-up heat source which can operate simultaneously. A series of principal heat diffusers are connected in parallel and arranged to be supplied with heat-carrying fluid from either or both of the heat sources, and a series of make-up heat diffusers are connected in parallel and arranged to be supplied from either one or both of the heat sources. The two series of diffusers are arranged to be supplied with heat at the same time, separately, or alternately. The principal source is a low-temperature heat source arranged to supply the series of principal diffusers via a first mixing cylinder; the make-up source is a high-temperature source arranged to supply the series of make-up diffusers via a second mixing cylinder; and, the first and second mixing cylinders are joined by a double connection so that each can supply the other, with the arrangement being such that the principal heat source can supply the series of make-up diffusers via the first mixing cylinder and then the second mixing cylinder, and that the make-up source can supply the series of principal diffusers via the second mixing cylinder and then the first mixing cylinder.

24 Claims, 1 Drawing Figure

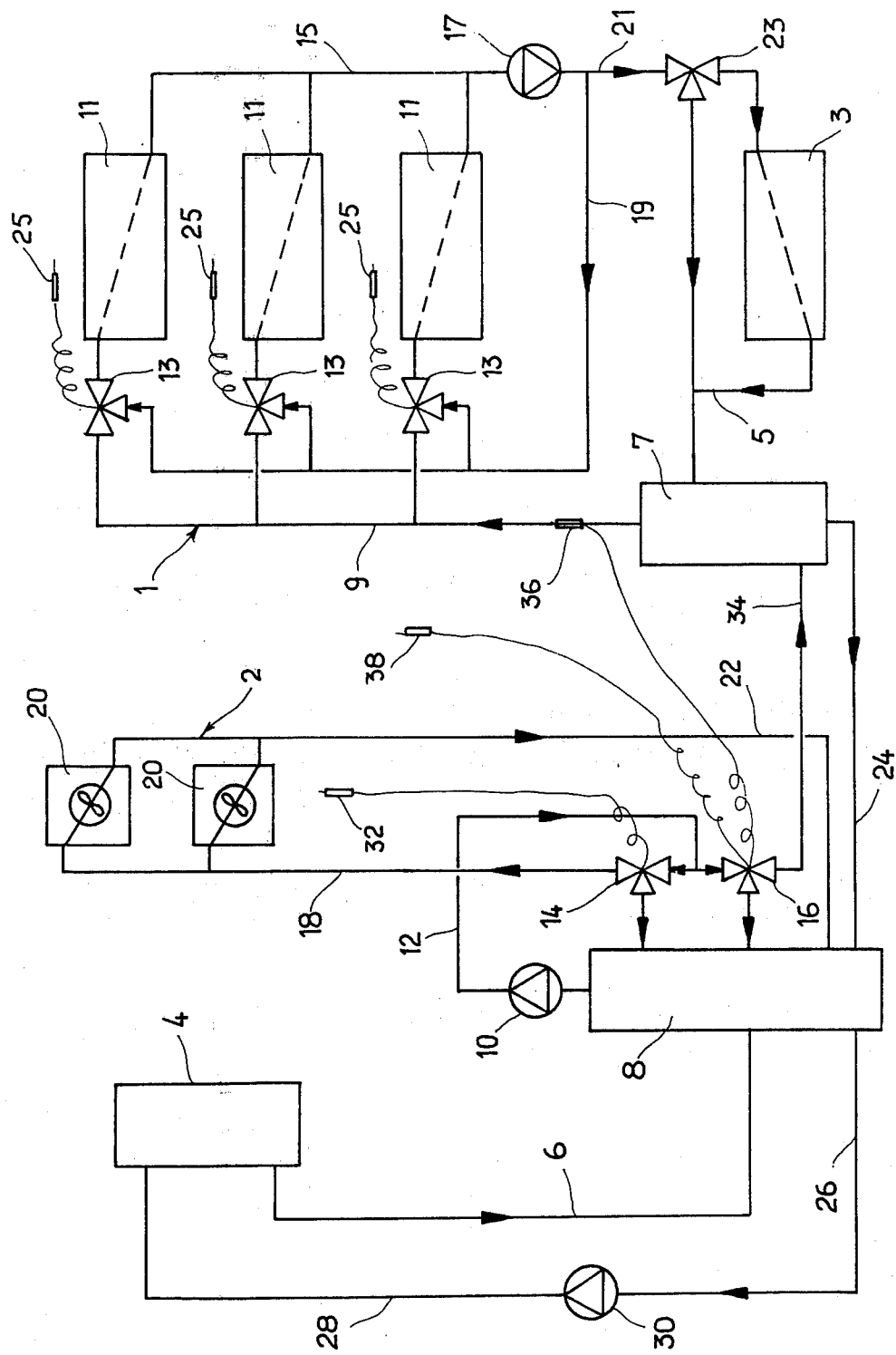

CENTRAL HEATING PLANT

The present invention relates to central heating plant for heating public or private premises, and particularly to such plant comprising a principal source of heat and a make-up source of heat which feed a series of principal radiators and a series of make-up radiators by means of two mixing cylinders.

In this technical sphere, a "high-temperature" heat source is commonly taken to be a heat source from which a heat-carrying fluid emerges at a temperature of approximately 90° C., whereas the temperature of fluid emerging from a so-called "low-temperature" source is approximately 40° C.

It is well known to heat premises of a variety of kinds by means of central heating plant constructed in the form of a circuit incorporating a high-temperature source of heat-carrying fluid whereof the rate of flow through radiators or other heat diffusers situated on the premises to be heated, is caused to vary.

As known radiators are of relatively low efficiency in respect of the heat exchange occurring through their walls between the high-temperature heat-carrying fluid and the ambient air of the premises to be heated, the application of such conventional plant proves to be expensive with regard to the fuel consumed by the heaters feeding these circuits to produce an acceptable minimum temperature in the heated premises.

Moreover, whether the operating adjustment of the radiators of such plant is performed manually or by means of thermostats, the temperature control of the heated premises usually evolves in the form of a sawtooth graph, and this can constitute a source of discomfort for any occupants of the premises.

Furthermore, under certain climatic conditions, the outputs of these conventional plants may be inappropriate, i.e. excessive or inadequate, and a make-up heating circuit independent of the principal circuit may be applied by itself or as a complement to the principal circuit. However, the temperature control of the premises may be even more erratic in view of the possible simultaneous operation of two independent circuits.

It is an object of the present invention to remove or at least reduce these disadvantages, and also to realise substantial economy in fuel consumption due to a more satisfactory method of use of the radiators as well as a great flexibility of application and control.

According to the present invention there is provided a central heating plant comprising a principal heat source and a make-up heat source which can operate simultaneously, a series of principal heat diffusers connected in parallel and arranged to be supplied with heat-carrying fluid by one and/or the other of said heat sources, and a series of make-up heat diffusers connected in parallel and arranged to be supplied by the one and/or the other of said heat sources, in which the two series are arranged to be supplied with heat at the same time, separately, or alternately, the principal source is a low-temperature heat source arranged to supply the series of principal diffusers via a first mixing cylinder, the make-up source is a high-temperature source arranged to supply the series of make-up diffusers via a second mixing cylinder, and the first and second mixing cylinders and joined by a double connection so that each can supply the other, the arrangement being such that the principal heat source can supply the series of make-up diffusers via the first mixing cylinder and then the second mixing cylinder, and that the make-up source can supply the series of principal diffusers via the second mixing cylinder and then the first mixing cylinder.

Preferably, the first mixing cylinder is arranged to feed each of the principal diffusers via a first inlet and the sole outlet of a motorised three-way valve, the other inlet of each valve being arranged to receive a fraction of the output flow from the principal diffusers, and said outlet flow also being connected to the inlet of the principal heat source.

Each of the motorised three-way valves co-operating with a principal diffuser may be controlled by a thermostat, so that the input flows of each valve feeding the corresponding principal diffuser with heat-carrying fluid at constant flow and variable temperature may be modulated as required.

A motorised three-way valve located upstream of the principal heat source may be provided to direct to the inlet of the first mixing cylinder an adjustable fraction of the output flow of the principal diffusers.

The second mixing cylinder may be arranged to feed the make-up diffusers via the sole inlet and one outlet of a motorised three-way valve the other outlet of which is in direct communication with the second mixing cylinder, the outlet of the series of make-up diffusers being connected to the second mixing cylinder which is also connected to the inlet of the make-up heat source. In this case, thermostats are advantageously incorporated to control the motorised three-way valve through which the second mixing cylinder supplies the make-up diffusers, so that the make-up diffusers can be supplied according to requirements with heat-carrying fluid at a constant temperature and variable flow rate.

Analogously, the second mixing cylinder may be arranged to feed the first mixing cylinder through the sole inlet and one outlet of a motorised three-way valve the other outlet of which is in direct communication with the second mixing cylinder.

The plant may also incorporate at least one thermostat to respond to the temperature of the heat-carrying fluid leaving the first mixing cylinder to feed the principal diffusers, so as to control the motorised three-way valve through which the second mixing cylinder feeds the first mixing cylinder and thus modulate, according to requirements, the flow of heat-carrying fluid from the second to the first cylinder.

Manual or thermostatic control devices for detecting the ambient temperature in the areas to be heated may be associated with the thermostats controlling the motorised three-way valve through which the second mixing cylinder feeds the first, to short-circuit said thermostats when the external temperature exceeds a predetermined value and causing a maximum feed from the second to the first mixing chamber.

An embodiment of the invention will now be described, by way of example, with reference to the accompanying drawing which is a diagrammatical illustration of a central heating plant.

Referring to the drawing, the central heating plant comprises a principal or fundamental heating circuit in the form of a low-temperature heating circuit 1, with which is co-ordinated a make-up, emergency, or standby heating circuit in the form of a high-temperature heating circuit 2.

The principal or low-temperature circuit 1 comprises a low-temperature heat source in the form of a heat pump 3 which primarily feeds the circuit 1 but may feed both circuits 1 and 2, or only the circuit 2, as described below. The heat pump is preferably coupled by means of a hydraulic circuit to an accumulating generator formed by the combination of natural elements such as ambient air, shallow sub-surface waters, and/or soil strata close to the ground surface, from which thermal energy is extracted for use as the heat source of the heat pump. The heat pump 3 consequently draws heat from this accumulating generator and transmits the heat to the heat-carrying fluid (usually water) which flows through the central heating plant. The heated fluid passes through an outlet pipe 5 to a mixing cylinder which acts to provide a buffering capacity and assures homogenisation in the temperature of the heat-carrying fluid received from the different pipes which feed the cylinder 7, as will be described below. The heat-carrying fluid, homogenous in temperature, is distributed via pipe 9 to a grid of principal radiators 11 connected in parallel and situated at or near the areas to be heated. The radiators are fed via one of the two inlets and then the sole outlets of motorised three-way valves 13 which correspond in number to the number of principal radiators 11.

After having lost a particular quantity of heat through the walls of the principal radiators 11, the heat-carrying fluid is ducted via pipe 15 to a transfer pump 17 which effects the flow of the heat-carrying fluid through the principal circuit 1. This fluid flow is divided at the outlet from the pump 17 to be distributed, in parallel, on the one hand via pipe 19 to the second inlets of each of the motorised three-way valves 13, and on the other hand via pipe 21 to the inlet of a three-way valve 23. One outlet of the valve 23 returns a fraction of the heat-carrying fluid to the heat pump where it is reheated, whereas the other outlet directs the remaining fraction of the heat-carrying fluid to the mixing cylinder 7.

Each of the motorised three-way valves 13 is controlled by a thermostat 25 whose temperature sensor responds to the ambient temperature in the area being heated, or within the space of influence of the corresponding radiator 11. The coupling between each thermostat 25 and the corresponding valve 13 is such that a change in aperture of one of the two inlets of the three-way valve 13 causes an opposite change in the aperture of the other inlet. The quantity of heat dissipated by each radiator may thus be governed as a function of the requirements of the area or of the part of the area in question, by modulation of the rate of supply of heat-carrying fluid at a given constant temperature, emerging from the pipe 9, and of the incoming flow of heat-carrying fluid which is not reheated emerging from the pipe 19. Such modulation is performed in proportions determined by the thermostats 25. Thus, a constant flow of heat-carrying fluid at variable temperature is passed through the radiators. Analogously, the three-way valve 23 is preferably motorised and controlled by a thermostat (not illustrated) of which the temperature sensor responds to the temperature of the heat-carrying fluid at the outlet from the heat pump. The modulation of the flows of heat-carrying fluid returning to be reheated, and of heat-carrying fluid conveyed direct to the mixing cylinder 7, is thus performed under satisfactory conditions so that a constant given temperature, for example 45° C., is constantly obtained in the cylinder.

The make-up heating circuit 2 comprises a high-temperature heat source 4 formed by a boiler operating on for example gas and feeding via pipe 6 to a second mixing cylinder 8, the water which forms the heat-carrying fluid of the plant. The water in the circuit 2 is at a temperature of, for example, 90° C. which is substantially greater than that of the water in the first mixing cylinder 7. The second mixing cylinder 8 plays a part wholly analogous to that played by the first cylinder, that is to say it homogenises the temperature of the heat-carrying fluid it has received from the different feed pipes, as will be described below. Under the action of a transfer pump 10, the heat-carrying fluid is conveyed at the same time, via pipe 12, to the sole inlets of two motorised three-way valves 14 and 16. Each of the valves 14 and 16 has a first outlet for the return of the heat-carrying fluid to the mixing cylinder 8.

The second outlet of the three-way valve 14 renders it possible to feed, via pipe 18, a grid of make-up diffusers 20 connected in parallel and situated either in the same areas or in case of the same areas as the radiators 11, or in outbuildings or other areas adjacent to the premises. The makeup diffusers 20 may be in the form of blower-convectors, whereby the convectors produce for the ambient air a complementary supply of heat drawn from the hot heat-carrying fluid and the blowers speed up the distribution of the air thus reheated.

The heat-carrying fluid is then reconveyed via pipe 22 to the second mixing cylinder 8, into which also leads pipe 24 from the first mixing cylinder 7. The circuit 2 is looped by pipes 26, 28 which convey the heat-carrying fluid from the second mixing cylinder 8 to the inlet of the high-temperature make-up heat source 4, the flow of the heat-carrying fluid being effected by a transfer pump 30.

Motorised three-way valve 14 is controlled by a thermostat 32 the temperature sensor of which is situated in the area influenced by the blower-convectors 20, so that it is possible to modulate, according to requirements, the flow of heat-carrying fluid conveyed to the mixing cylinder 8 as compared to the flow of heat-carrying fluid used to provide the complementary input of heat. The method of application of the blower-convectors 20 consequently produces variable flow but constant temperature of the heat-carrying fluid.

The second outlet of the motorised three-way valve 16 renders it possible to feed the mixing cylinder 7 of the circuit 1 through pipe 34 with fluid at a temperature higher than that of the fluid received from the low-temperature source 3 and from the valve 23. The valve 16 is controlled, on the one hand by a thermostat 36 the temperature sensor of which responds to the temperature of the heat-carrying fluid at the outlet of the mixing cylinder 7; thus, it is possible to modulate the flow of hotter fluid transferred from the high-temperature circuit 2 to the low-temperature circuit 1, related to the flow returned direct via the valve 16 to the mixing cylinder 8. The valve 16 is controlled, on the other hand, by at least one thermostat 38 which is connected in parallel with the thermostat 36 and the temperature sensor of which responds to the temperature at the area being heated. If this temperature rises above a predetermined value, the thermostat 38 puts the thermostat 36 out of action, effects full opening of the second outlet of the valve 16 to give maximum feed to the first mixing cylinder 7, and causes shut-off of the boiler 4. The coupling thus obtained between the two heat sources and the two grids of diffusers renders it possible partially to substitute the high-temperature source 4 for the low-temperature source 3 in its functions relative to the principal radiators 11 in the case of a stoppage which may be caused by a total or partial failure of the low-temperature source 3. In the case of inadequate output from the source 3, during unfavourable climatic conditions, the coupling between the various elements enables the hightemperature source 4 to supplement the source 3 partially in its functions with respect to the radiators 11, whereas this source 4 does not stop playing its part with respect to the make-up blower-convectors 20. Similarly, in the case of a breakdown affecting the radiators 11 and their related elements, the low-temperature source may feed the blower-convectors 20, thus playing their part as emergency diffusers. If this proves to be inadequate, both heat sources 3 and 4 may be applied at the same time to feed the blower-convectors 20.

Assuming, for example, that the plant is installed in a dwelling, the principal heating circuit 1 assures minimum heating of the premises by continuous operation during a cold season and during a cold between-seasons period. The make-up heating circuit 2 renders it possible during a cold season, be it by continuous operation and total coupling to the principal circuit 1, or by intermittent operation if the premises are not occupied all the time, to provide the additional quantity of heat required to provide the premises with a comfortable ambient temperature. The intermittent application of the make-up circuit 2 is made possible by virtue of the very short response periods of this circuit, obtained by employing the blower-convectors 20 modulated by the valve 14.

During a hot between-seasons period, the high-temperature source 4 and the transfer pump 30 of the make-up circuit 2 may be deactivated. The thermostat 38 may then be adjusted so that the valve 16 assures total return of the heat-carrying fluid to the mixing cylinder 7, and the make-up heating is obtained, if appropriate, merely by means of the blower-convectors 20. The operation of the blower-convectors is modulated by the valve 14 controlled by the thermostat 32, the heat source 3 alone supplying the two grids of heat diffusers 11 and 20, in this case.

Finally, during a hot season, the principal circuit 1 may be switched off, for example by the action of the valve 23 to direct all the heat-carrying fluid it receives to the mixing cylinder 7, or by deactivation of the transfer pump 17, and the possible heating requirements may be met by intermittent operation of only the make-up circuit 2.

The plant in accordance with the invention consequently has exceptional flexibility of operation, because of the many possibilities of simultaneous, separate, or even alternate operations of the different co-ordinated elements whose different control and modulation devices render it possible to obtain the desired temperatures in a uniform manner.

It should be noted that the nature of the heat sources is not significant to the plant in accordance with the invention, and they may be formed by any suitable kind of heaters making use of various kinds of fuels, to act as low-temperature or high-temperature heat sources. For example, a peat furnace, or even solar panels, may be substituted for the heat pump as the low-temperature heat source, whereas the gas boiler may be replaced by a boiler of another kind, e.g. fuel-operated or electric.

Analogously, manual control devices may be substituted for various thermostats.

The plant in accordance with the invention consequently proves to be particularly appropriate for heating virtually all kinds of industrial, commercial and private premises, as the high-temperature heat source which forms the only possibly dangerous element of the plant operates under surveillance, the make-up circuit being located essentially in the presence of the occupiers of the heated premises.

Finally, this improved heating plant offers the advantage that it may be incorporated into almost any existing heating system, by adding to and co-ordinating with the existing system the element or elements required for it to operate in accordance with the present invention.

What we claim is:

1. A central heating plant comprising a principal heat source and a make-up heat source which can operate simultaneously, a series of principal heat diffusers connected in parallel and arranged to be supplied with heat-carrying fluid by one and/or the other of said heat sources, and a series of make-up heat diffusers connected in parallel and arranged to be supplied by the one and/or the other of said heat sources, in which the two series are arranged to be supplied with heat at the same time, separately, or alternately, the principal source is a low-temperature heat source arranged to supply the series of principal diffusers via a first mixing cylinder, the make-up source is a high-temperature source arranged to supply the series of make-up diffusers via a second mixing cylinder, and the first and second mixing cylinders are joined by a double connection so that each can supply the other, the arrangement being such that the principal heat source can supply the series of make-up diffusers via the first mixing cylinder and then the second mixing cylinder, and that the make-up source can supply the series of principal diffusers via the second mixing cylinder and then the first mixing cylinder.

2. A plant according to claim 1, in which the first mixing cylinder is arranged to feed each of the principal diffusers through a first inlet and the sole outlet of a motorised three-way valve, the other inlet of each valve being arranged to receive a fraction of the output flow from the principal diffusers and said output flow also being connected to the inlet of the principal heat source.

3. A plant according to claim 2, in which each of the motorised three-way valves is controlled by a thermostat to provide for modulation of the input flows to each valve supplying the corresponding principal diffuser with heat-carrying fluid at a constant flow rate and variable temperature.

4. A plant according to claim 1, in which a motorised three-way valve located upstream of the principal heat source is arranged to direct an adjustable fraction of the output flow from the principal diffusers directly to an inlet of the first mixing cylinder.

5. A plant according to claim 1, in which the second mixing cylinder is arranged to feed the series of make-up diffusers via the sole inlet and one outlet of a motorised three-way valve the other outlet of which is in direct communication with the second mixing cylinder, and in which the outlet of the series of make-up diffusers is connected to the second mixing cylinder which is also connected to the inlet of the make-up heat source.

6. A plant according to claim 5, in which at least one thermostat is arranged to control the motorised three-way valve through which the second mixing cylinder feeds the make-up diffusers, so that the make-up diffusers can be supplied as required with heat-carrying fluid at constant temperature and variable flow rate.

7. A plant according to claim 1, in which the second mixing cylinder is arranged to feed the first mixing cylinder through the sole inlet and one outlet of a motorised three-way valve the other outlet of which is in direct communication with the second mixing cylinder.

8. A plant according to claim 7, in which at least one thermostat is arranged to respond to the temperature of the heat-carrying fluid leaving the first mixing cylinder to feed the principal diffusers and control the motorised three-way valve through which the second mixing cylinder supplies the first mixing cylinder so as to modulate the flow of heat-carrying fluid from the second to the first cylinder.

9. A plant according to claim 8, in which manual or thermostatic control devices arranged to respond to ambient temperatures at the areas to be heated, are connected in parallel with the thermostatic devices controlling the motorised three-way valve through which the second mixing cylinder feeds the first, for the purpose of short-circuiting that valve when the external temperature is greater than a predetermined value and causing a maximum feed to the first mixing cylinder from the second.

10. A plant according to claim 8, in which the two three-way valves through which the second cylinder feeds the make-up diffusers and the first mixing cylinder, respectively, are arranged to be fed in parallel from a transfer pump arranged to draw from an outlet of the second mixing cylinder.

11. A plant according to claim 1 in which a motorised three-way valve located upstream of the principal heat source is arranged to direct an adjustable fraction of the output flow from the principal diffusers directly to an inlet of the first mixing cylinder, and the second mixing cylinder is arranged to feed the series of make-up diffusers via the sole inlet and one outlet of a motorised three-way valve the other outlet of which is in direct communication with the second mixing cylinder, and the outlet of the series of make-up diffusers is connected to the second mixing cylinder which is also connected to the inlet of the make-up heat source.

12. A plant according to claim 11, in which at least one thermostat is arranged to control the motorised three-way valve through which the second mixing cylinder feeds the make-up diffusers, so that the make-up diffusers can be supplied as required with heat-carrying fluid at constant temperature and variable flow rate.

13. A plant according to claim 11, in which the second mixing cylinder is arranged to feed the first mixing cylinder through the sole inlet and one outlet of a motorised three-way valve the other outlet of which is in direct communication with the second mixing cylinder.

14. A plant according to claim 13, in which at least one thermostat is arranged to respond to the temperature of the heat-carrying fluid leaving the first mixing cylinder to feed the principal diffusers and control the motorised three-way valve through which the second mixing cylinder supplies the first mixing cylinder so as to modulate the flow of heat-carrying fluid from the second to the first cylinder.

15. A plant according to claim 14, in which manual or thermostatic control devices arranged to respond to ambient temperatures at the areas to be heated, are connected in parallel with the thermostatic devices controlling the motorised three-way valve through which the second mixing cylinder feeds the first, for the purpose of short-circuiting that valve when the external temperature is greater than a predetermined value and causing a maximum feed to the first mixing cylinder from the second.

16. A plant according to claim 14, in which the two three-way valves through which the second cylinder feeds the make-up diffusers and the first mixing cylinder, respectively, are arranged to be fed in parallel from a transfer pump arranged to draw from an outlet of the second mixing cylinder.

17. A plant according to claim 1, in which a motorised three-way valve located upstream of the principal heat source is arranged to direct an adjustable fraction of the output flow from the principal diffusers directly to an inlet of the first mixing cylinder, the second mixing cylinder is arranged to feed the series of make-up diffusers via the sole inlet and one outlet of a motorised three-way valve the other outlet of which is in direct communication with the second mixing cylinder, in which the outlet of the series of make-up diffusers is connected to the second mixing cylinder which is also connected to the inlet of the make-up heat source, at least one thermostat is arranged to control the motorised three-way valve through which the second mixing cylinder feeds the make-up diffusers, so that the make-up diffusers can be supplied as required with heat-carrying fluid at constant temperature and variable flow rate, and the second mixing cylinder is arranged to feed the first mixing cylinder through the sole inlet and one outlet of a motorised three-way valve the other outlet of which is in direct communication with the second mixing cylinder.

18. A plant according to claim 17, in which at least one thermostat is arranged to respond to the temperature of the heat-carrying fluid leaving the first mixing cylinder to feed the principal diffusers and control the motorised three-way valve through which the second mixing cylinder supplies the first mixing cylinder so as to modulate the flow of heat-carrying fluid from the second to the first cylinder.

19. A plant according to claim 18, in which manual or thermostatic control devices arranged to respond to ambient temperatures at the areas to be heated, are connected in parallel with the thermostatic devices controlling the motorised three-way valve through which the second mixing cylinder feeds the first, for the purpose of short-circuiting that valve when the external temperature is greater than a predetermined value and causing a maximum feed to the first mixing cylinder from the second.

20. A plant according to claim 18, in which the two three-way valves through which the second cylinder feeds the make-up diffusers and the first mixing cylinder, respectively, are arranged to be fed in parallel from a transfer pump arranged to draw from an outlet of the second mixing cylinder.

21. A plant according to claim 2, in which a motorised three-way valve located upstream of the principal heat source is arranged to direct an adjustable fraction of the output flow from the principal diffusers directly to an inlet of the first mixing cylinder.

22. A plant according to claim 3, in which a motorised three-way valve located upstream of the principal heat source is arranged to direct an adjustable fraction of the output flow from the principal diffusers directly to an inlet of the first mixing cylinder.

23. A plant according to claim 9, in which the two three-way valves through which the second cylinder feeds the make-up diffusers and the first mixing cylinder, respectively, are arranged to be fed in parallel from a transfer pump arranged to draw from an outlet of the second mixing cylinder.

24. A plant according to claim 19, in which the two three-way valves through which the second cylinder feeds the make-up diffusers and the first mixing cylinder, respectively, are arranged to be fed in parallel from a transfer pump arranged to draw from an outlet of the second mixing cylinder.

* * * * *

UNITED STATES PATENT AND TRADEMARK OFFICE
CERTIFICATE OF CORRECTION

PATENT NO. : 4,189,096
DATED : February 19, 1980
INVENTOR(S) : Edmond Girard

It is certified that error appears in the above-identified patent and that said Letters Patent are hereby corrected as shown below:

Column 1, Line 65 change "and" to --are--

Signed and Sealed this

Fourteenth Day of October 1980

[SEAL]

Attest:

SIDNEY A. DIAMOND

Attesting Officer     Commissioner of Patents and Trademarks